(No Model.) 5 Sheets—Sheet 2.

C. S. GOODING & S. W. LADD.
ASSORTING MACHINE.

No. 404,904. Patented June 11, 1889.

WITNESSES:
Walter L. Perry
J. Edward Porter

INVENTORS
Charles S. Gooding
Sherman W. Ladd
BY
E. Frank Woodbury
ATTORNEY (No Model.)  5 Sheets—Sheet 3.

C. S. GOODING & S. W. LADD.
ASSORTING MACHINE.

No. 404,904.  Patented June 11, 1889.

WITNESSES
Walter L. Berry
J. Edward Porter

INVENTORS
Charles S. Gooding
Sherman W. Ladd
BY
E. Frank Woodbury.
ATTORNEY (No Model.) 5 Sheets—Sheet 4.

C. S. GOODING & S. W. LADD.
ASSORTING MACHINE.

No. 404,904. Patented June 11, 1889.

WITNESSES
Walter L. Perry
J. Edward Potter

INVENTORS
Charles S. Gooding
Sherman W. Ladd
BY
E. Frank Woodbury.
ATTORNEY (No Model.)  5 Sheets—Sheet 5.

C. S. GOODING & S. W. LADD.
ASSORTING MACHINE.

No. 404,904.  Patented June 11, 1889.

WITNESSES
Walter L. Perry
J. Edward Porter

INVENTORS
Charles S. Gooding
Sherman W. Ladd
BY
E. Frank Woodbury
ATTORNEY

… (continued)

UNITED STATES PATENT OFFICE.

CHARLES S. GOODING, OF BROOKLINE, AND SHERMAN W. LADD, OF SOMERVILLE, MASSACHUSETTS.

ASSORTING-MACHINE.

SPECIFICATION forming part of Letters Patent No. 404,904, dated June 11, 1889.

Application filed October 26, 1888. Serial No. 289,250. (No model.)

*To all whom it may concern:*

Be it known that we, CHARLES S. GOODING, residing at Brookline, in the county of Norfolk and State of Massachusetts, and SHERMAN W. LADD, residing at Somerville, in the county of Middlesex and State of Massachusetts, citizens of the United States, have invented a new and useful Assorting-Machine, of which the following is a specification.

Our invention relates to machines designed to be used in the assorting of articles of different thicknesses, such as links of leather or other similar material used in the manufacture of leather-link belting.

It has for its object the efficient and rapid assorting of the links.

Figure 1:
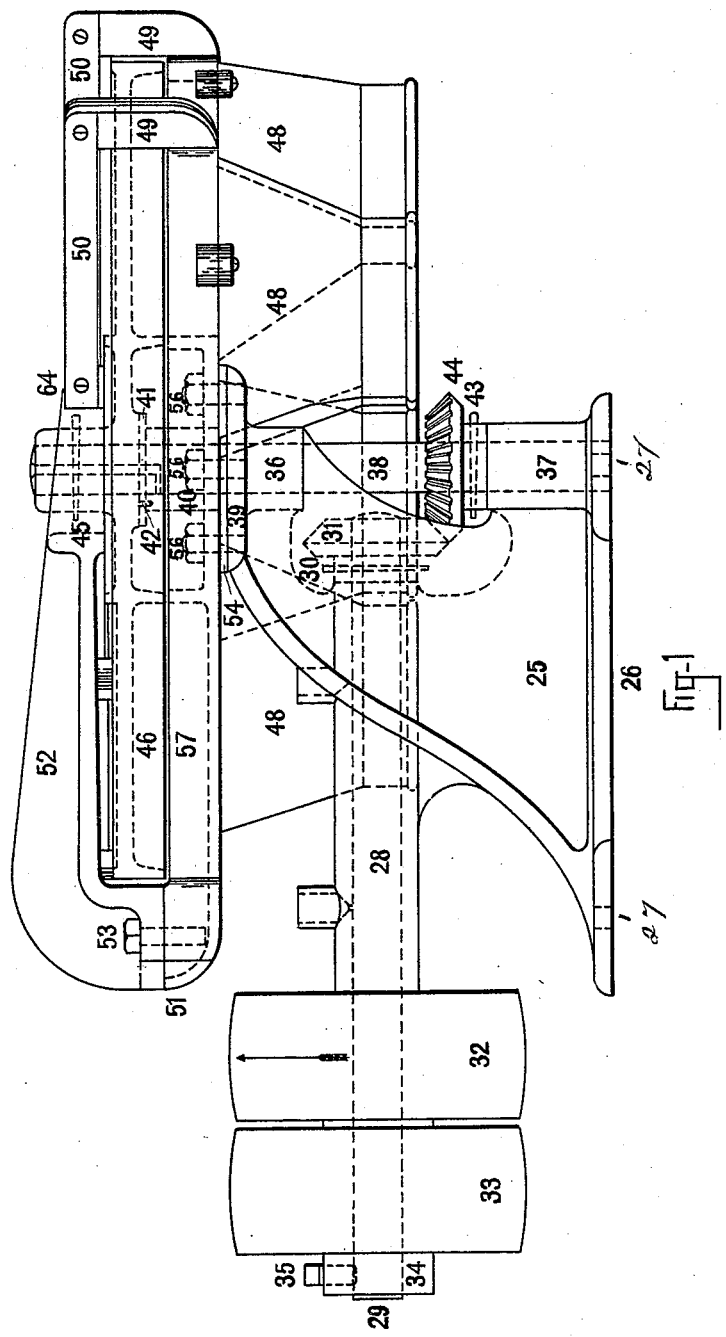
Figure 2:
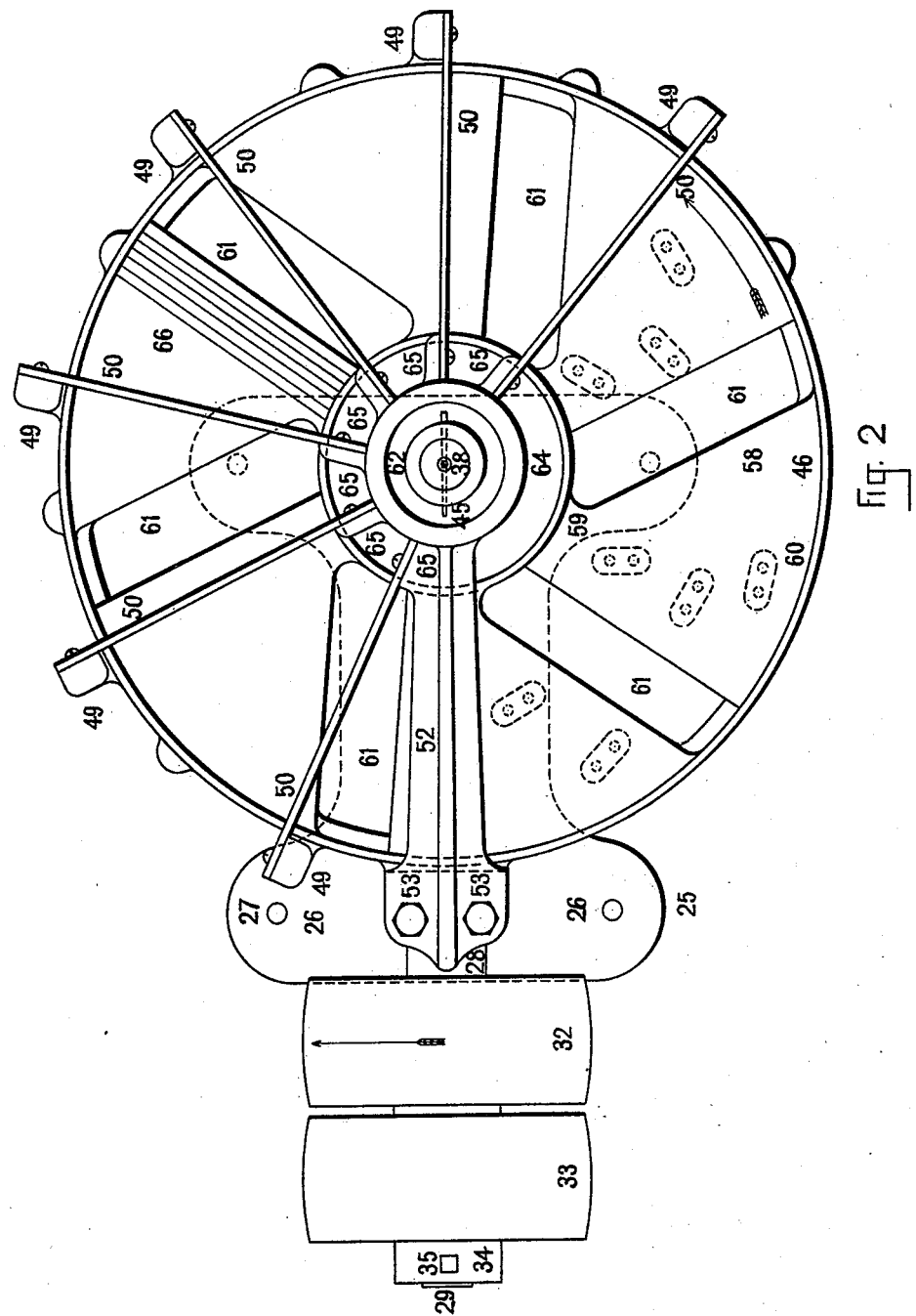
Figure 3:
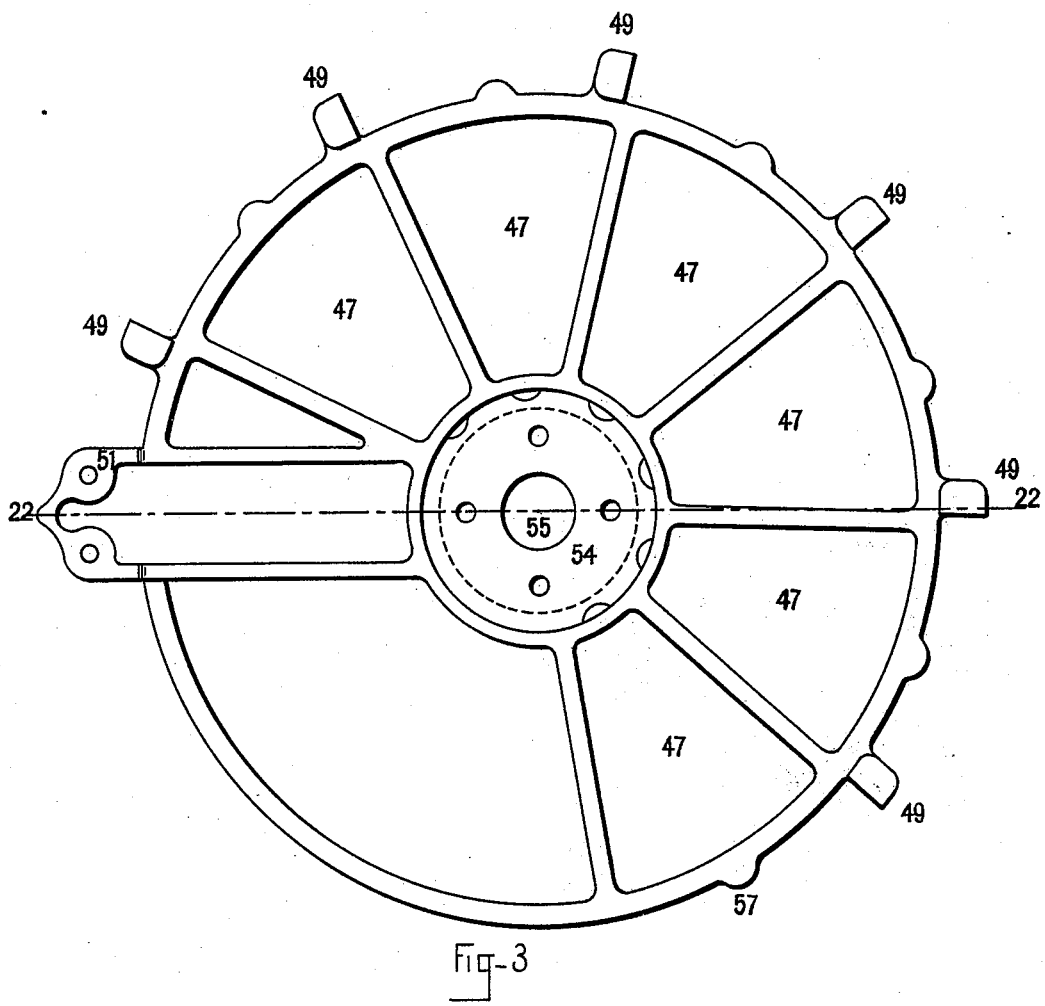
Figure 4:
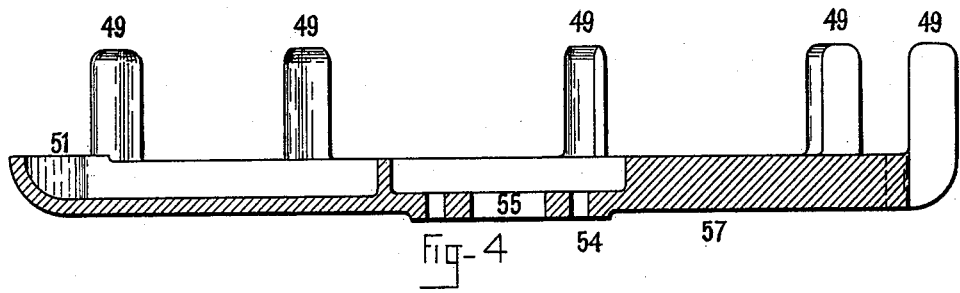
Figure 5:
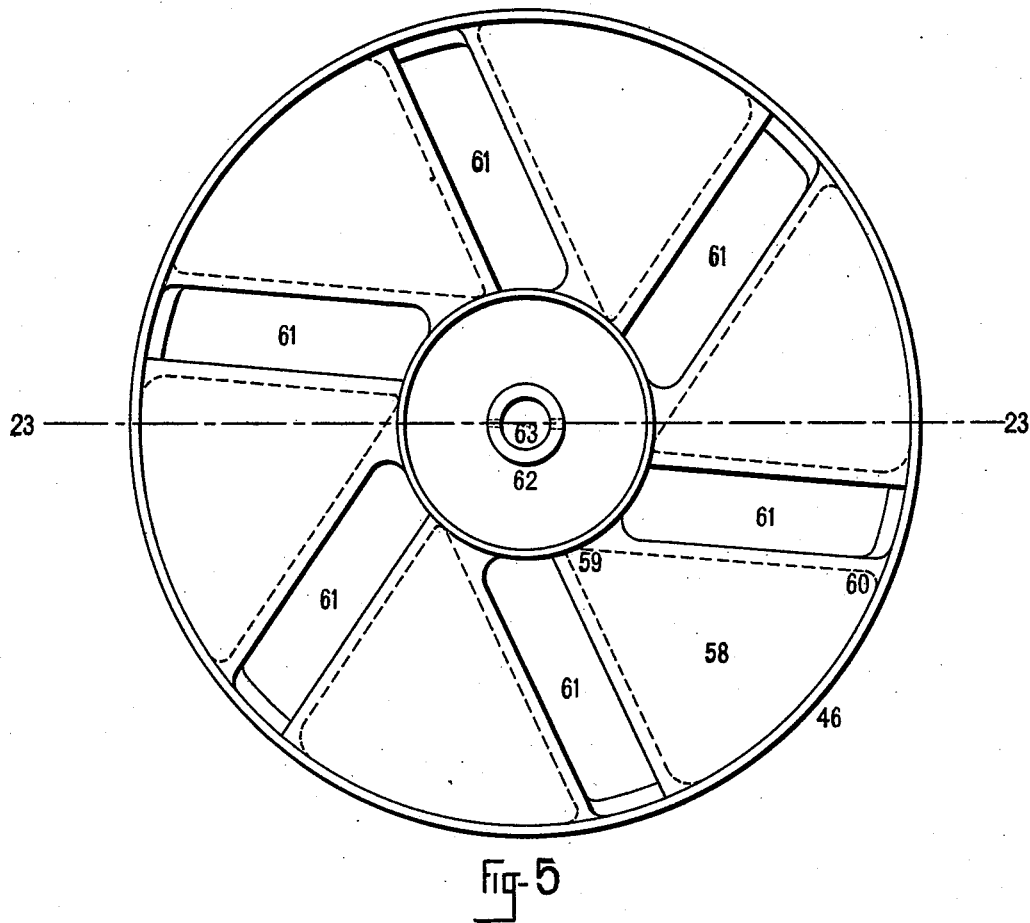
Figure 6:
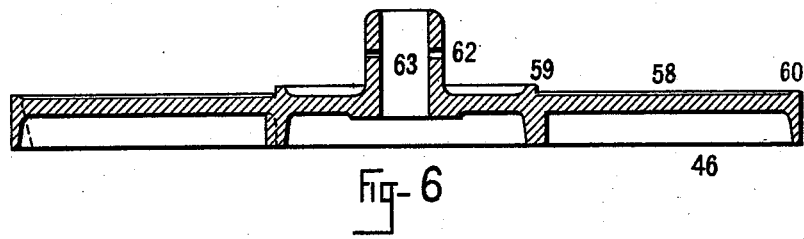
Figure 8:
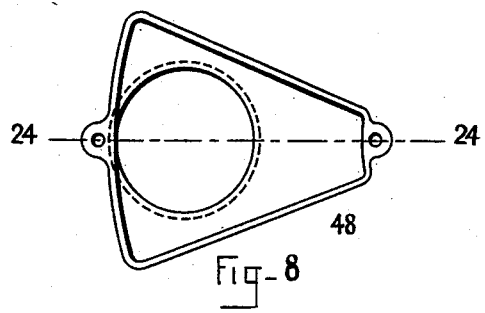
Figure 7:
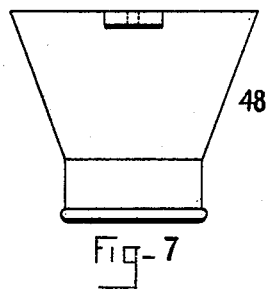
Figure 9:
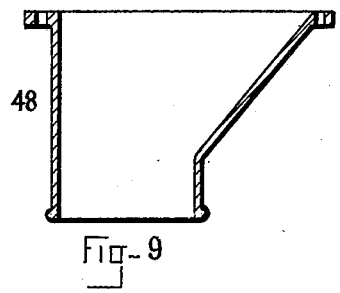
Figure 16:
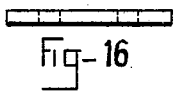
Figure 17:
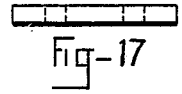
Figure 10:
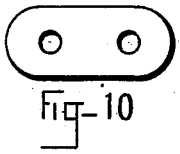
Figure 11:
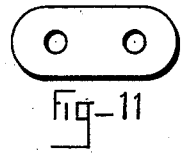
Figure 18:
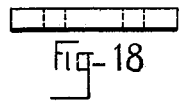
Figure 19:
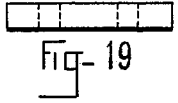
Figure 20:
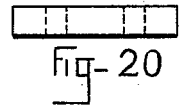

Figure 1 represents our machine in front elevation, and Fig. 2 is a plan of Fig. 1. Fig. 3 represents chute-plate in plan, and Fig. 4 is a vertical sectional view of Fig. 3 on line 22 22. Fig. 5 represents assorting feed-plate in plan, and Fig. 6 is a vertical sectional view of Fig. 5 on line 23 23. Fig. 7 represents chute in elevation, and Fig. 8 is a plan of Fig. 7. Fig. 9 is a vertical sectional view of Fig. 8 on line 24 24. Figs. 10 to 15, inclusive, represent in plan style of leather links to be assorted, and Figs. 16 to 21, inclusive, are respectively side views of the link.

The base-frame 25 is provided with the following: Foot 26, provided with bolt-holes 27, by means of which the base-frame may be securely fastened in its position, and bearing 28, adapted to receive driving-shaft 29, to which is secured, by means of taper-pin 30, the driving bevel-gear 31, and the tight and loose pulleys 32 and 33, respectively, which are designed to receive power conveyed by means of a belt. All endwise movements of the shaft 29 are prevented by the collar end of the bevel-gear 31 being in contact with one end of the bearing 28, and the hub of the tight pulley 32, which is fast to the shaft, being in contact with the other end of the bearings 28. The loose pulley 33 is held in its position endwise on the shaft by means of collar 34, which is fastened to the shaft by means of set-screw 35. Bearings 36 and 37 are designed to receive driven shaft 38, flange 39 to receive chute-plate 57, and annular projection 40 to center the chute-plate and to receive the end-thrust of driven shaft 38 by means of friction-washer 41, which is pinned to the end of annular projection 40 by means of pin 42.

The driven shaft 38 has secured to it by means of taper-pin 43 the driven bevel-gear 44, which is placed so as to mesh with and be driven by driving-gear 31. To the upper end of the driven shaft is fastened, by means of taper-pin 45, the assorting feed-plate 46, the under side of which is in contact with the friction-washer 41, so as to present a large and durable surface to receive the end-thrusts and weight of the driven shaft and its connected parts.

The chute-plate 57 (represented by Figs. 3, 4, 1, and 2) is provided with the following parts, viz: Chute-openings 47, six in number, each one of which is provided with a chute, as 48, which is fastened to the under side of the chute by means of lugs and screws, as shown; assorting-finger lugs 49, six in number, to each one of which is fastened, by means of screws, one end of an assorting-finger 50; projecting surface 51, to which is bolted, by means of bolts 53, the assorting-arm 52 and the center portion 54 provided with the opening 55 of a diameter sufficient to be held centrally in its position by the annular projection 40 in contact with the flange 39, to which it is firmly bolted by means of bolts 56.

The assorting feed-plate 46 (represented by Figs. 5, 6, 1, and 2) is provided with the following parts, viz: Annular finished surface 58 is divided into six equal portions by the openings 61 and central hub 62, provided with an opening 63 of a diameter sufficient to receive the driven shaft 38, to which it is fastened by means of taper-pin 45.

The assorting-arm 52 is provided with the following parts, viz: Annular hand portion 64, having the lugs 65, six in number, to each one of which is secured, by means of a screw, one end of one of the assorting-fingers 50.

The chutes 48 are six in number, and are made, as represented by Figs. 7, 8, and 9, as follows: The top surface is of a shape so that when it is fastened to the under side of the chute-plate 57 it will be the same size and shape as the chute-opening 47. The lower portion is round, as a matter of convenience in attaching to it a spout designed to convey the assorted links to suitable separate places of deposit.

The style of links to be assorted are represented by Figs. 10 to 21, inclusive. Six different thicknesses of links are shown by Figs. 16 to 21, inclusive.

All the parts described being made of suitable metal, they are assembled, as represented by Figs. 1 and 2, as follows: The driving-shaft 29 is placed in its bearing 28 in the base-frame 25. Driving bevel-gear 31 is fastened to the driving-shaft by means of taper-pin 30. Tight pulley 32 is fastened to shaft in a position upon the shaft so that one side of its hub and one side of the gear 31 will act as collars in preventing any sidewise movements of the shaft, while the side of the hub of pulley 32 and the collar 34, which is secured to shaft by means of set-screw 35, serve as collars for the loose pulley 33. Driven bevel-gear 44 is then placed in its place above the bearing 37. Driven shaft 38 is placed in its bearings 36 and 37. Driven gear 44 is fastened to driven shaft 38 in its position by means of taper-pin 43, so that it will mesh with and be driven by driving-gear 31. Chute-plate 57 is centered upon the flange 39 by means of opening 55 and annular projection 40, and is bolted to the flange 39 by means of the bolts 56. Each chute-plate opening 47 is provided with a chute 48, which is fastened to the bottom of the chute-plate. A friction-washer is placed in contact with the top of annular projection 40, to which it is pinned by means of pin 42. The assorting-plate is placed on the driven shaft 38, to which it is fastened by means of taper-pin 45, so that the bottom of the hub 62 will have frictional contact with friction-washer 41, which will receive and will prevent all downward thrusts of the driven shaft and its connected parts. The assorting-plate 46 does not come in contact with the chute-plate. Assorting-arm 52 is bolted to chute-plate 57 by means of bolts 53. Assorting-fingers 50 are fastened to assorting-finger lugs 49 and lugs 65 by means of screws.

Figure 21:
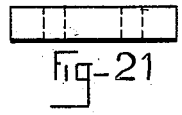
Figure 12:
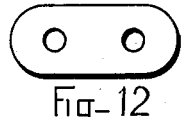
Figure 13:
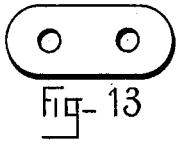
Figure 14:
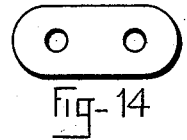
Figure 15:
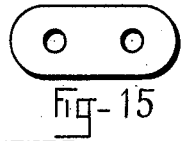

The operation of our machine is as follows: Rotary motion being given to driving-shaft 29 by power conveyed by means of belt to pulley 32 in a direction, as represented by arrows, Figs. 1 and 2, the assorting feed-plate 46 will rotate in a direction, as indicated by an arrow, Fig. 2, in a horizontal plane perpendicular to the axis of the shaft 38, which is driven by the power being conveyed to it by means of bevel-gears 31 and 44. The assorting-fingers are located and set as follows: Each finger is placed nearly over the farther side, in the direction of movement of assorting feed-plate, of the chute-opening, which it guards. The distance from the bottom of the fingers, which are set in planes parallel to the plane of the annular finished surface 58 of the assorting feed-plate, is graduated to different measures, as follows:

Referring to the different thicknesses of links, as represented by Figs. 16 to 21, which are full size, the reduction in size to the scale of Fig. 2 being represented by dotted outlines upon assorted feed-plate, Fig. 2, the first finger from the front of the machine, in the left-hand movement of the assorting-plate, as indicated, will present an opening between it and the annular finished surface 58 of the assorting-plate of a height a little less than the thickness represented by link Fig. 21. In a like manner the openings presented between each finger and the surface of the assorting feed-plate will be a little less than the thickness of the links which it is intended that the finger should stop—that is to say, the second finger would stop link Fig. 20, and fingers third, fourth, fifth, and sixth would stop links Figs. 19, 18, 17, and 16, respectively. When a link is stopped by a finger, the continued movement of the assorting-plate presents one of the openings 61, through which the link drops into a chute 48, from which it may be conducted to convenient receptacles.

In placing the links upon the assorting feed-plate, as represented by dotted outline in Fig. 2, no link should be placed in or very near the circumferential track of another link on the same surface between any two of the openings 61, for the reason that each link to be assorted should be presented to its assorting-finger. Each link is stopped by its assorting-finger, and is permitted to drop into its separate receptacle, thereby assorting links with great accuracy.

The number of assorted sizes is controlled by the number of assorting-fingers and their respective chute-openings and chutes, which may be increased or diminished at pleasure.

The only apparent time limit to the rapidity of assorting-links is in the time required in the placing of the links upon the assorting feed-plate.

For links made of some qualities of material it may be desirable to make the whole or any portion of the annular surface 58 rough, to offer greater resistance to the sliding of the links upon the surface of the assorting feed-plate, thereby permitting the more accurate assortment of links which may present an uneven or fibrous surface.

In order to illustrate method of roughening, a portion, as 66, Fig. 2, of annular surface is represented as being roughened by shallow lines or cuts in the annular surface.

It is obvious that our machine may be adapted by mere formal changes to the assorting of many articles of manufacture which are required to be assorted to sizes.

What we claim as new, and desire to secure by Letters Patent, is—

1. In an assorting-machine for assorting articles of different thicknesses into several groups of uniform thicknesses, respectively, the combination of the following instrumentalities, to wit: a revolving perforated assorting feed-plate 46, revolving above a chute-plate 57, which is provided with chute-openings 47, said assorting feed-plate revolving below a series of assorting-fingers 50, which are fixed at graded distances above the upper surface of said feed-plate, and operative mechanism, substantially as and for the purposes set forth.

2. In an assorting-machine, the chute-plate 57, provided with chute-openings 47 and chutes 48, in combination with assorting feed-plate 46, assorting-fingers 50, and operative mechanism, substantially as described.

3. In an assorting-machine, the chute-plate 57, provided with assorting-finger lugs 49, arm 52, provided with lugs 65, and assorting-fingers 50, in combination with assorting feed-plate 46, provided with openings, and operative mechanism, substantially as described.

4. In an assorting-machine, the combination of the chute-plate 57 and assorting-fingers 50 with assorting feed-plate 46 and devices whereby the assorting feed-plate may be rotated, substantially as and for the purpose set forth.

In testimony whereof we have signed our names to this specification in the presence of two subscribing witnesses.

CHAS. S. GOODING.
SHERMAN W. LADD.

Witnesses:
E. FRANK. WOODBURY,
WALTER L. PERRY.